(12) United States Patent  
McGuire

(10) Patent No.: US 6,368,472 B1
(45) Date of Patent: Apr. 9, 2002

(54) ELECTROLYTIC CHEMICAL GENERATOR

(76) Inventor: Byron Duvon McGuire, 7130 S. Bloomington Trail, Underwood, IN (US) 47177

(*) Notice: Subject to any disclaimer, the term of this patent is extended or adjusted under 35 U.S.C. 154(b) by 0 days.

(21) Appl. No.: 09/433,502

(22) Filed: Nov. 3, 1999

Related U.S. Application Data

(60) Provisional application No. 60/107,070, filed on Nov. 4, 1998.

(51) Int. Cl.[7] .............................. C25B 9/00; C25C 7/00; C25D 17/00
(52) U.S. Cl. ....................... 204/252; 204/263; 204/265; 204/266; 204/275.1; 204/278
(58) Field of Search ................................. 205/620, 621, 205/626, 618; 204/252, 263, 265, 266, 275.1, 277, 278

(56) References Cited

U.S. PATENT DOCUMENTS

| | | |
|---|---|---|
| 1,101,078 A | 6/1914 | Diefer |
| 4,142,950 A | 3/1979 | Creamer et al. |
| 4,210,501 A | 7/1980 | Dempsey et al. |
| 4,247,376 A | 1/1981 | Dempsey et al. |
| 4,248,681 A | 2/1981 | Sweeney |
| 4,250,126 A * | 2/1981 | Yates ........................ 261/70 |
| 4,334,968 A * | 6/1982 | Sweeney ................... 205/556 |
| 4,374,711 A | 2/1983 | Ogawa |
| 4,374,712 A | 2/1983 | Gray |
| 4,426,261 A | 1/1984 | Fushihara |
| 4,436,608 A | 3/1984 | Bennett et al. |
| 4,555,323 A | 11/1985 | Collier et al. |
| 4,613,415 A | 9/1986 | Wreath et al. |
| 4,683,040 A | 7/1987 | Seko |
| 4,744,877 A | 5/1988 | Maddock |
| 4,769,137 A | 9/1988 | Powell, Jr. |
| 4,793,909 A | 12/1988 | Maddock |
| 4,997,540 A | 3/1991 | Howlett |
| 5,094,734 A | 3/1992 | Torrado |
| 5,114,547 A * | 5/1992 | Ullman ..................... 205/620 |
| 5,376,242 A | 12/1994 | Hayakawa |
| 5,411,641 A | 5/1995 | Trainham, III et al. |
| 5,458,743 A * | 10/1995 | Allen ......................... 205/556 |
| 5,460,706 A | 10/1995 | Lisboa |
| 5,565,082 A | 10/1996 | Nakamatsu et al. |
| 5,650,058 A | 7/1997 | Wenske et al. |
| 5,693,202 A | 12/1997 | Gestermann et al. |
| 5,798,036 A | 8/1998 | Zimmerman et al. |

* cited by examiner

Primary Examiner—Donald R. Valentine
Assistant Examiner—Wesley A. Nicolas
(74) Attorney, Agent, or Firm—Joan L. Simunic; Middleton Reutlinger

(57) ABSTRACT

An apparatus for generating electrolytic products, including chlorine and ozone, that includes an electrolytic cell having a cathode in a cathode chamber, an anode in an anode chamber, an electrode chamber separating element disposed between the cathode and anode and sight tubes for visualizing the amount of catholyte and anolyte in the electrolytic chambers is provided. The cathode and the anode include first sides, that are contained within the electrode chambers and participate in the cell's oxidation-reduction reactions, and second sides that project outside of the electrode chambers and which may serve as replacement surfaces for the first sides.

32 Claims, 6 Drawing Sheets

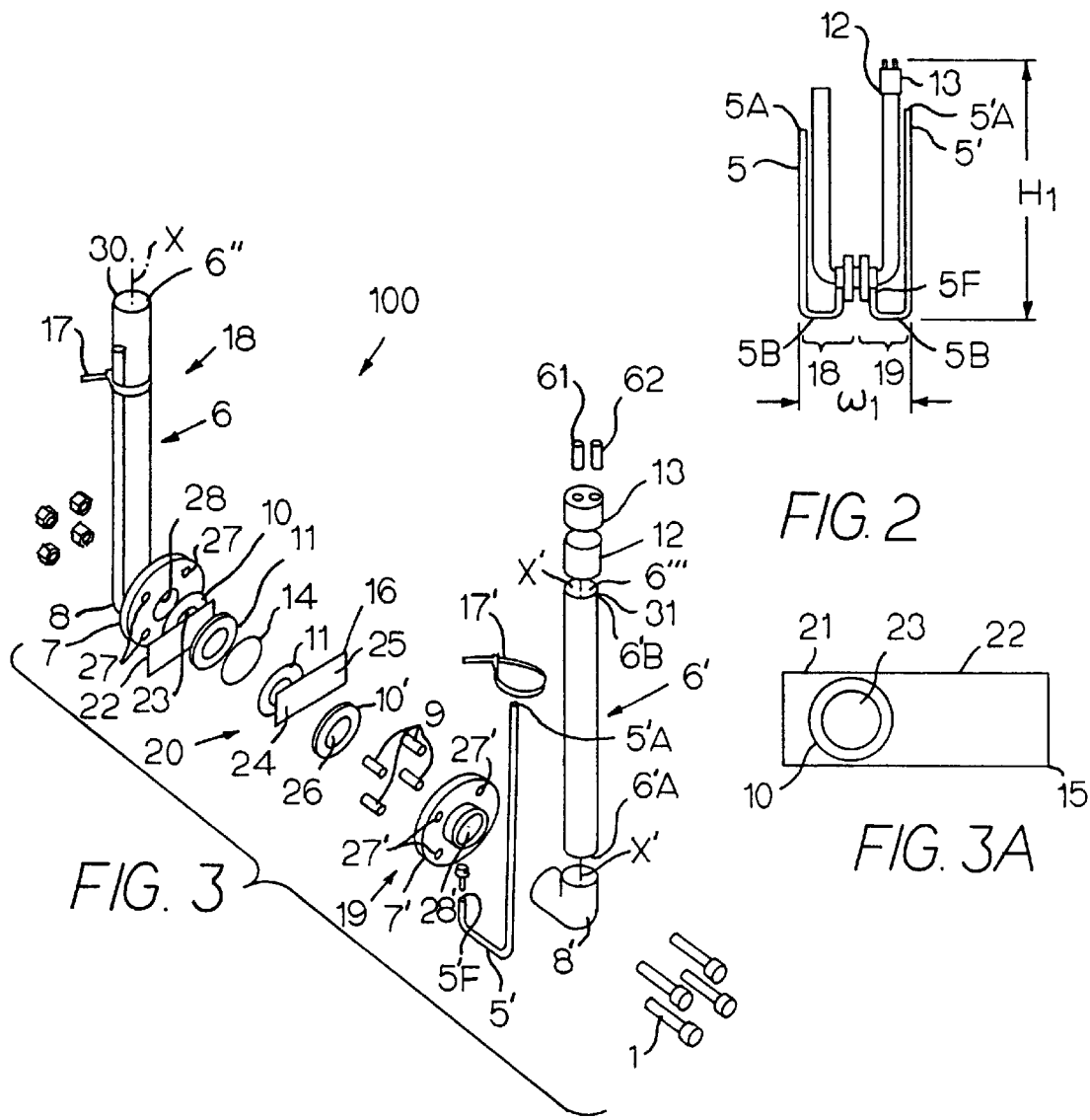
FIG. 3
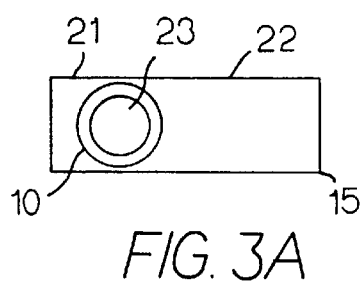
FIG. 2
FIG. 3A
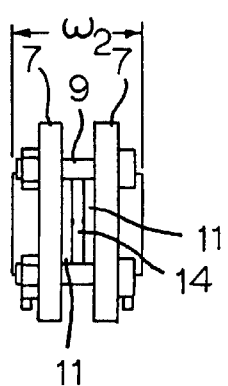
FIG. 4
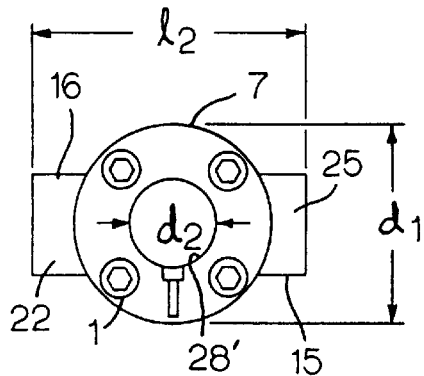
FIG. 5

ELECTROLYTIC CHEMICAL GENERATOR

This application claims the benefit of United States Provisional Application No. 60/107,070 filed Nov. 4, 1998.

BACKGROUND OF THE INVENTION

1. Field of the Invention

The present invention relates generally to devices and methods for producing chemicals through electrolysis, and more specifically to a portable, inexpensive device for producing chemicals, such as chlorine and ozone, by electrolysis.

2. Description of the Related Art

Chlorine and ozone are both powerful chemical oxidizing agents that are used for a variety of purposes, including disinfecting waste water, recreational applications and treating water intended for drinking. In many regions of the world, chlorine and, to a much lesser extent, ozone are used separately, but seldom in combination, to disinfect drinking water. While chlorine is more widely used than ozone for treating water, ozone is as much as three thousand times more effective at disinfecting water. Devices that produce chlorine and ozone via electrolysis are known in the art. However, many such devices have shortcomings that include: failure to regulate the quantity of electrolytic products introduced into the water being treated; failure to provide a means for visually determining the levels of anolyte and catholyte in the respective electrode chambers; and, failure to provide electrodes that need not be immediately replaced when they initially are dissipated to the extent that they no longer function properly. Moreover, prior art devices are of complex construction and comprise parts which are not readily available, especially in third world countries. Additionally, many electrolytic devices for producing chlorine or ozone are large, expensive and difficult to transport, as well as complicated enough to preclude operation by unskilled individuals.

SUMMARY OF THE INVENTION

It is an object of the present invention to provide an apparatus for generating chemicals, including chlorine and ozone, that comprises readily available parts that may be assembled and operated by relatively unskilled individuals.

It is a further object of the present invention to provide an apparatus for generating chemicals, including chlorine and ozone, that comprises electrodes that serve as their own replacement parts when they initially are dissipated.

It is yet another object of the present invention to provide an apparatus for generating chemicals, including chlorine and ozone, that is portable, efficient in operation and is less expensive than other electrolytic chemical generators.

It is even another object of the present invention to provide an apparatus that can adjustably regulate the quantity of electrolytic products produced.

It is also an object of the present invention to provide a method to adjustably regulate the production of electrolytic products via gaseous attenuation.

It is a further object to provide a method for generating chemicals, including chlorine and ozone, and a method for treating water.

Further objects, advantages and features of the present invention will be apparent from the detailed description herein.

In the present invention, there is provided an apparatus for generating chlorine by the electrolysis of a chloride salt and ozone by the electrolyzing of oxygen, as well as other chemicals via electrolysis. Chlorine and ozone may be generated simultaneously or individually, as the circumstances require. In one aspect of the invention, the apparatus comprises an electrolytic cell that includes a pair of electrodes, including an anode and a cathode, each having first and second end portions, a cathode chamber that is in fluid communication with the first end portion of the cathode and an anode chamber that is in fluid communication with the first end portion of the anode. The second end portion of the anode is external to the anode chamber and the second end portion of the cathode is external to the cathode chamber. Both second end portions are configured for attachment of a power source. In yet a further aspect of the invention, either of the electrodes may be repositioned so that the second end portion of the electrode participates in the oxidation-reduction reactions of the electrolytic cell.

In yet another aspect of the invention, the electrolytic cell may include a first sight tube in fluid communication with the anode chamber, and a second sight tube in fluid communication with the cathode chamber. These sight tubes may also serve as an inlet for the addition of air, oxygen, chloride salts, sodium hydroxide, water and other constituents into the anode and cathode chambers. These sight tubes may also be used to introduce turbulence into the fluids located within the electrode chambers at points near the cathode and the anode. Turbulence within the anolyte and catholyte can significantly improve the efficiency of the half cell reactions with the electrolytic cell.

Within another aspect of the invention, the cathode and the anode chambers are constructed of a translucent or transparent material that enables the operator of the apparatus to view the liquid level and the activity within the chambers.

In a further aspect of the invention, the apparatus includes an electrolytic cell that includes at least a first flange and a second flange wherein the flanges are opposed to each other, and first and second elongated members wherein the first elongated member is coupled to the first flange and the second elongated member is coupled to the second flange. Both the first and second elongated members may include one or more horizontal and/or vertical sections. Both elongated members also include an upper portion and a lower portion. The apparatus further includes a pair of electrodes, including an anode and a cathode, disposed between the opposing flanges, an electrode-chamber-separating element disposed between the anode and cathode that is in fluid communication with the cathode chamber and anode chamber, and a pair of sight tubes. The first sight tube is in fluid communication with the anode chamber. The second sight tube is in fluid communication with the cathode chamber. In one embodiment of the invention, the electrode-chamber-separating element includes a membrane. In another embodiment of the invention, the apparatus contains no electrode-chamber-separating element.

In another aspect of the invention, a gas, such as hydrogen gas, that is produced within the cathode chamber during electrolysis, may be used to regulate the production of electrolytic products, such as chlorine and ozone. For example, in the electrolysis of a chloride salt, such as sodium chloride or potassium chloride, hydrogen gas is produced at the cathode. This hydrogen gas can be trapped within the cathode chamber and brought into contact with the cathode. The portion of the surface of the cathode contacted by the gas does not function as a reaction site for the electrolytic reaction while it is in contact with the gas. As a result, the current in the cell is reduced and the reaction decreases at the anode. The quantity of anolytic products generated at the anode is thereby reduced proportional to the area of the surface of the cathode contacted by the gas.

The gas, which would otherwise exit from the cathode through the upper portion of the chamber, may be trapped within the cathode chamber by various means. One method for trapping the gas involves rotating the entire apparatus on a horizontal axis initially parallel to the plane of the membrane thereby bringing the level of the liquid catholyte within the cathode chamber above the intersection of the horizontal and vertical portions of the chamber. The apparatus may be rotated sufficiently so as to bring the pocket of hydrogen gas trapped within the horizontal portion of the chamber into contact with the operational surface of the cathode. Another method for trapping the gas within the cathode chamber involves introducing an adjustable barrier into the chamber at the top side of the horizontal section of the chamber or at another portion of the chamber where it may operate as intended. The airtight barrier may be raised or lowered as a curtain, partially closing off the cathode chamber, so as to allow gas to be trapped on the side of the barrier facing the cathode. As production of the gas continues it will displace the liquid catholyte around the cathode, thereby reducing the overall production of the electrolytic cell. Other configurations of the apparatus are also envisioned in carrying out this method of regulating the generation of electrolytic products via gas attenuation at one electrode, such as introducing a mechanical means by which the gas causes the metering of fresh water into the cathode chamber.

In other aspects of the invention, methods of generating chlorine and ozone are disclosed, including electrolyzing a chloride salt and oxygen in the electrolytic cell of the present invention.

In a further aspect of the invention, methods of treating water are provided that include, electrolyzing a salt of chloride to produce chlorine gas and electrolyzing oxygen to produce ozone with the electrolytic cell and contacting water with the chlorine gas and ozone.

In another aspect of the invention, other chemicals, in addition to chlorine and ozone, may be produced within the apparatus.

BRIEF DESCRIPTION OF THE DRAWINGS

FIG. 2 is a side view of the apparatus of the present invention.

FIG. 3 is an exploded perspective view of the apparatus of the present invention.

FIG. 3A is a side view of a surface of cathode 15 shown facing a cathode chamber.

FIG. 4 is a front view of a portion of the electrolysis chamber of the apparatus of the present invention.

FIG. 5 is a side view of the electrolysis chamber shown in FIG. 4.

DESCRIPTION OF THE PREFERRED EMBODIMENT

For the purpose of promoting an understanding of the principles of the invention, reference will now be made to preferred embodiments and specific language will be used to describe the same. It will nevertheless be understood that no limitation of the scope of the invention is thereby intended, such alterations and further modifications of the invention, and such further applications of the principles of the invention as illustrated herein, being contemplated as would normally occur to one skilled in the art to which the invention relates.

As discussed above, the present invention relates to an apparatus for generating chemicals, including chlorine and ozone, a method of generating chemicals, including chlorine and ozone utilizing the apparatus of the present invention, and a method for regulating the generation of electrolytic products via gas attenuation and a method of treating water. The apparatus is portable and may be assembled by relatively unskilled individuals utilizing mostly readily available component parts.

Figure 1:
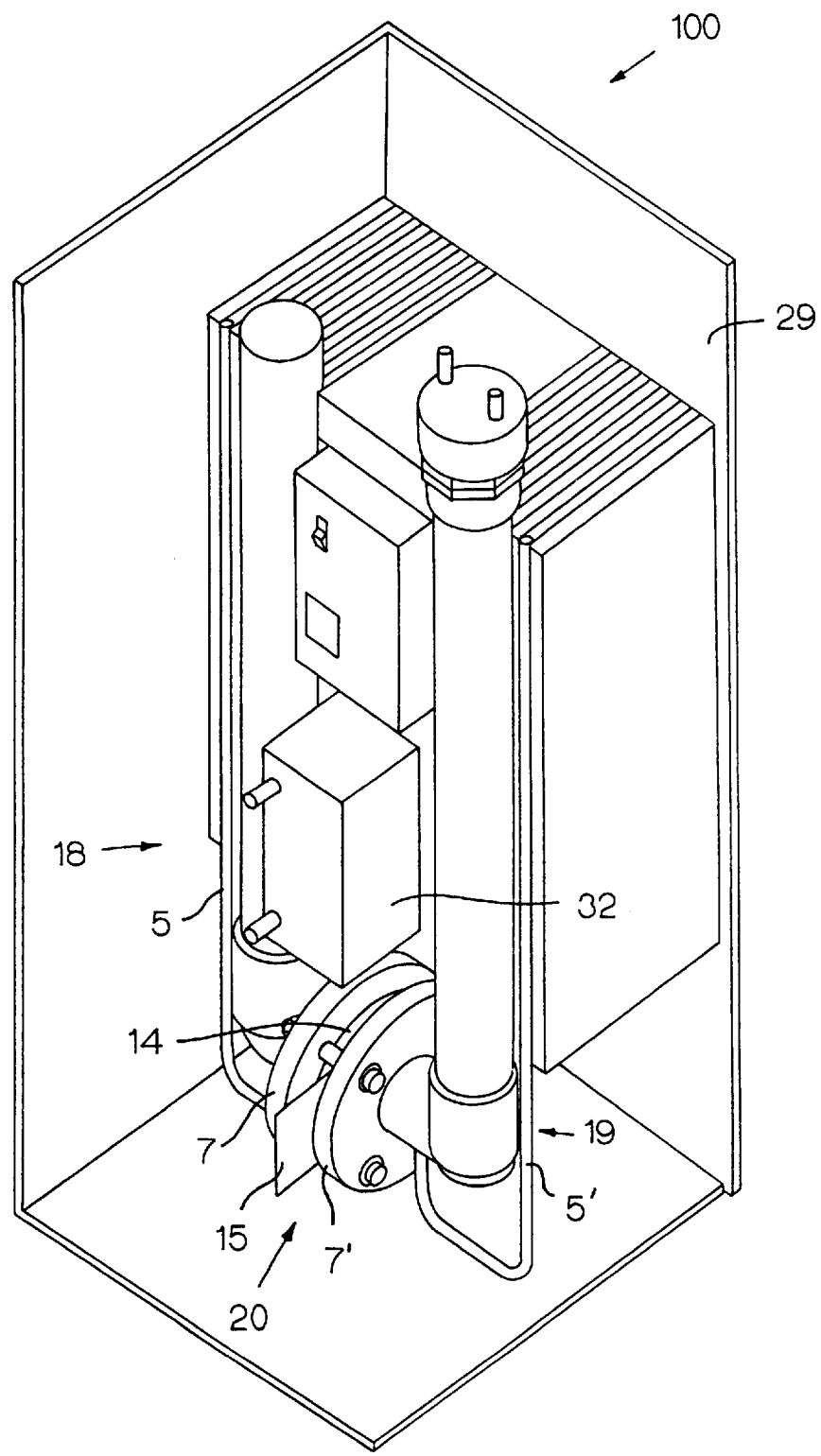
FIG. 1 is a perspective view of an apparatus for generating electrolytic products of the present invention shown mounted to a support structure.

In preferred embodiments of the invention, an apparatus for electrolytic chemical generation is shown in FIGS. 1–9. Referring to FIGS. 1–3, the apparatus includes an electrolytic cell 20 that comprises a pair of electrodes, an anode 16 and a cathode 15, an electrode-chamber-separating element 14 and opposing flanges 7 and 7'. Cathode 15 and anode 16 are spaced between opposing flanges 7 and 7'. Moreover, cathode 15 and anode 16 are sandwiched between gaskets 10, 11 and 11', 10' respectively. Gaskets 10, 11,11', and 10' function as spacers and seals between electrolytic components. The gaskets 10, 11, 11' and 10' are generally fabricated of rubber or a similar elastomeric material well known in the art. A cathode chamber 18 is provided and includes elongated member 6, elbow coupler 8, and first flange 7 disposed therein. Also, an anode chamber 19 is provided and includes elongated cylinder 6', elbow coupler 8' and second flange 7' disposed therein, whose interconnection will be discussed hereinafter.

The electrodes may be composed of materials typically used as electrodes as known in the art. For example, the anode 16 may be composed of carbon, graphite or metals, including titanium and other transition metals and alloys. As a further example, the cathode 15 may be composed of stainless steel, nickel, chrome or another transition metals and alloys. However, the electrodes are preferable composed of titanium and are further preferably composed of expanded titanium. The expanded metal, with its open mesh structure, provides a greater surface area for the electrolytic reaction and thus allows a greater quantity of electrolytic products to be generated. The expanded metal also allows for more efficient migration of liquids and gases. Moreover, a catalytic coating is preferably disposed on the outer surface of the anode 16 to lower the energy required to "crack" the salt. In the absence of this coating, an electrically resistive layer can form on the substrate of the anode 16 causing it to no longer function efficiently in the electrolytic reaction. The catalytic coating may be any such coating as known in the art, including transition metals, transition metal oxides, noble metals, noble metal oxides, and titanium oxides and combinations thereof. The transition metals may include zirconium, niobium, silver and hafnium. The noble metals may include platinum, tantalum, rhodium, iridium, ruthenium and gold. These metals and oxides may also be combined with tin metal. The noble metal oxides include iridium and ruthenium, but are preferably iridium oxides.

As seen in FIG. 3A, cathode 15 has a first end portion 21 and a second end portion 22. As shown in FIGS. 3 and 3A, a section of first end portion 21 is defined by area 23 within gasket 10 and represents a section of the cathode that participates in the oxidation-reduction reaction that occurs in electrolytic cell 20. As shown in FIG. 2 and FIG. 3A, cathode 15 is positioned in electrolytic cell 20 so that cathode chamber 18 is in fluid communication with a section of first end portion 21 of the cathode. Second end portion 22 of the cathode 15 extends outside of cathode chamber 18, as best seen in FIG. 5.

Similarly, as seen in FIG. 3, anode 16 has at least a first end portion 24 and a second end portion 25. A section of first end portion 24 of anode 16 is defined by area 26 within gasket 10' and represents a section of the anode 16 that participates in the oxidation-reduction reaction that occurs in electrolytic cell 20. Anode 16 is positioned in electrolytic cell 20 such that anode chamber 19 is in fluid communication with a section of first end portion 24 of the anode. Moreover, second end portion 25 of anode 16 extends outside of anode chamber 19, as best seen in FIG. 5.

The apparatus is preferably portable, but, with appropriate adaptations known in the art, it can be of a commercial scale. Length $l_1$ of electrolytic cell 20 shown in FIG. 2 may be about 4 inches to about 48 inches but is typically about 34 inches. Width $w_1$ of electrolytic cell 20 depicted in FIG. 2 may be about 2 inches to about 48 inches but is typically about 13 inches, depending on the flange size and piping orientation. As shown in FIG. 5, distance $l_2$ between end 22' of cathode 15 and end 25' of anode 16 may be about 3 inches to about 36 inches, but is typically about 9.5 inches, depending on unit diameter $d_2$ and electrode orientation. Diameter $d_2$ of flange 7, shown in FIG. 5, may be about 0.5 inches to about 12 inches, but is typically about 2 inches in many applications. Furthermore, width $w_2$ of the portion of electrolytic cell 20 between flanges 7 and 7' shown in FIG. 4 may be about 0.5 inches to about 48 inches, but is typically about 4.25 inches. An electrolytic cell may be made, for example, that weighs no more than about 7.8 pounds. It is to be noted that these dimensions are listed for illustrative purposes only and may be modified as desired accordingly as known in the art. The scale of all dimensions may be greatly enlarged or reduced as the situation and application demands, without departing from the scope of the present invention.

A power source may be advantageously connected to second end portion 22 and second end portion 25 of cathode 15 and anode 16, respectively. Thus, no power connection leads are required to be located within electrode chambers 18 and 19 of electrolytic cell 20. Additionally, should the first section of an electrode fail to function in the oxidation-reduction reaction, then the electrode in the apparatus may be rotated 180° such that a section of its second end portion is in fluid communication with its electrode chamber and can participate in the oxidation-reduction reaction occurring in the electrolytic cell. For example, if first end portion 21 of cathode 15 fails to function, cathode 15 may be rotated 180° such that second end portion 22 of cathode 15 that is facing opposing flange 7' is in fluid communication with cathode chamber 18. Thus, second end portion 22 may then participate in the oxidation-reduction reaction. Additionally, electrical leads or conductors may be attached to the electrodes permanently or semipermanently using means well known in the art.

Electrode-chamber-separating element 14 is advantageously disposed between cathode 15 and anode 16. Element 14 is typically disposed between gaskets 11 and 11', or solid spacers or sections of pipe or housing body, not shown, to obtain the desired mode of operation. The thicknesses of gaskets 11 and 11' affect the spacing between the membrane and the electrodes. The combined width of gaskets 11 and 11' and any added spacers, may be such that the electrodes are separated by 47.5 inches or less. In one embodiment of the invention, gaskets 11 and 11' may advantageously be about 0.25 inches thick, which allows cathode 15 and anode 16 to be separated by only about 0.5 inches. If the distance between the electrodes is large such enough, then the startup electrical conductivity through the cathode chamber may be excessively low, such that an electrolyte, including sodium hydroxide, may be placed in the cathode chamber to increase the conductivity and subsequent chemical production, otherwise a disproportionate amount of energy is expended in the form of resistance heating.

Electrode-chamber-separating element 14 includes any electrode-chamber-separating element as known in the art, including a membrane, a diaphragm or a ceramic diffusion barrier. For example, diaphragms may be made of one or more polymers, ceramics, asbestos, or a polymer-modified asbestos composite as known in the art. As a further example, electrode-chamber-separating element 14 may be any ion permeable membrane known in the art. However, electrode-chamber-separating element 14 is preferably a membrane and is further preferably an ion-exchange membrane, that allows cations, such as sodium ions, to travel from the anode chamber 19 to the cathode chamber 18 and resists the transportation of positively charged species across the membrane from the cathode chamber to the anode chamber. Electrode-chamber-separating element 14 preferably comprises a perfluorosulfonate polymer known as a NAFION membrane. However, electrode-chamber-separating element 14 may also be a perfluorinated membrane, such as a perfluorocarboxylate membrane known as a FLEMION membrane, or a perfluorosulfonate polymer, a TEFLON reinforcing fabric and a perfluorocarboxylate polymer all bonded together as known in the art. The membrane allows cations, such as sodium ions, to pass from the anode chamber into the cathode chamber where they combine with hydroxide ions to form sodium hydroxide. It is possible not to include an electrode-chamber-separating element 14 in the apparatus, but doing so results in less efficient production of chlorine and a higher generation of other electrolytic reaction products, particularly sodium hypochlorite. However, other chemicals may be effectively produced within the apparatus in the absence of an electrode-chamber-separating element 14, such as, for example, ozone.

As seen in FIG. 2, elongated members 6 and 6' are coupled to respective opposing flanges through coupler 8 and 8', respectively. As shown in FIG. 3, elongated members 6 and 6' have a longitudinal axis x and x' respectively and a cavity, 6" and 6'", respectively, that extends along the longitudinal axis, typically from one end of the member to the other end of the member. Elongated members 6 and 6' preferably have threads, which are not shown, that allow threaded attachment of elongated member 6 and 6' to coupler 8 and 8', respectively. However, elongated members 6 and 6' may also be attached to coupler 8 and 8', respectively, by conventional cement or welding techniques known in the art. Coupler 8 and 8', in turn, may be attached to flange 7 and 7', respectively, in similar fashion. Elongated members 6 and 6' may be made of glass, polypropylene, polyethylene, but are preferably made of polyvinyl chloride or other similar material of appropriate corrosion resistance. Elongated members 6 and 6' may be formed of various shapes, but preferably are formed in a cylindrical shape. Elongated member 6 of cathode chamber 18 can be vented to the atmosphere at top end 30 of the member. Elongated member 6' includes a cap 13 which is connected to elongated member 6' through adapter 12. Cap or plug 13 is preferably threadably joined to adapter 12. Cap or plug 13 may further be joined to a means for distributing an anolytic product, such as chlorine gas. The means for distributing the anolytic product may be any such means known in the art, including venturi suction, pump inlet suction, low pressure gas sweep and subsequent air injection, direct gas diffusion and direct injection.

Figure 6:
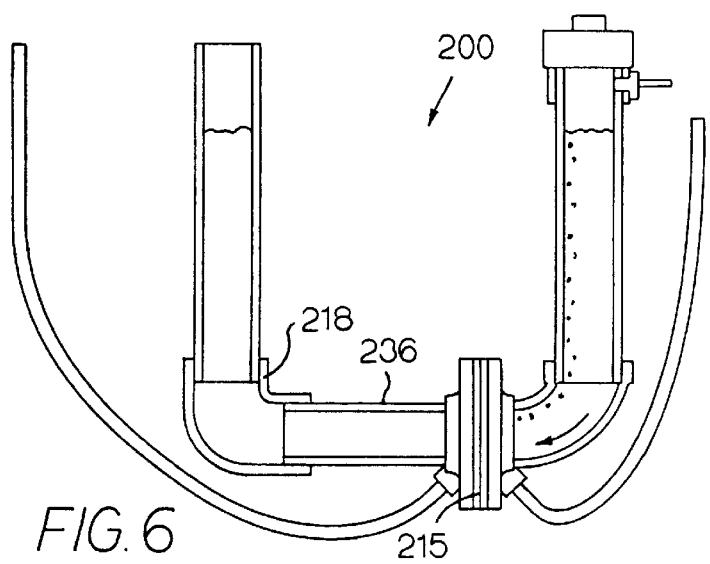
FIG. 6 and 6A views of another embodiment of the apparatus for generating electrolytic products of the present invention.

As shown in FIG. 3, air inlet 61 is vented to the atmosphere and outlet 62 is vented to the distributing means, such as the venturi, which is not shown. During production of chlorine, the venturi will draw air through inlet 61 into the anode chamber 19, where it is mixed with chlorine gas generated therein. The mixture of air and chlorine gas is then drawn through outlet 62 to the venturi and distributed, in turn, to the water that is to be treated. A preferred embodiment, does not include air inlet 61. Rather, in this embodiment, air is drawn by the venturi through sight tube 5' into anode chamber 19 so as to create turbulence within the chamber and provide air to be mixed with the chlorine gas generated therein. As shown in FIG. 6, this resulting air and chlorine gas mixture will exit anode chamber 19 through outlet 62 to travel to the venturi, not shown. Furthermore, the introduction of air into the vicinity of the anode below the liquid surface favors the evolution of a higher ozone yield by virtue of the added oxygen from the air coming in intimate contact with an environment rich in free radicals and a strong electrical field.

The quantity of air drawn into sight tube 5' maybe regulated by adjustably threading cap 13 onto elongated member 6'. The cap 13 may be threaded so as to allow air to leak through its connection into anode chamber 19. The quantity of air allowed to pass by cap 13 is proportional to the reduction in the quantity of air that enters the anode chamber 19 through sight tube 5'. In this manner, the amount of turbulence created by the air entering sight tube 5' may be regulated.

As seen in FIGS. 1–3, electrolytic cell 20 also includes sight tubes 5 and 5'. Sight tube 5 is preferably attached to flange 7, and is in fluid communication with cathode chamber 18 at one end and the atmosphere at the other end. Sight tube 5 may also be supported by fastening the sight tube to elongated member 6 with cable tie 17, or other appropriate means. Sight tube 5' is preferably attached to flange 7', and is in fluid communication with anode chamber 19 at one end and the atmosphere at the other end. Sight tube 5' may also be supported by fastening the sight tube to elongated member 6' with cable tie 17', or other appropriate means. However, sight tubes 5 and 5' may be attached to, in fluid communication with, any part of cathode chamber 18 and anode chamber 19, respectively, the sight tubes may comprise any flexible polymer known in the art, but preferably comprise polyvinyl chloride or polyethylene. Sight tubes 5 and 5' are further preferably translucent or transparent.

Sight tube 5 allows monitoring of the level of catholyte in the cathode chamber and sight tube 5' allows monitoring of the level of anolyte in the anode chamber. By allowing visual monitoring of the relative amounts of solutions in the respective electrode chambers, the sight tubes serve as a diagnostic tool. For example, if the structural integrity of electrode chamber separating element 14 is altered, such as element 14 having a hole or if element 14 is not properly sealed in the apparatus, the solutions in sight tube 5 or 5' will be at the same level. Under these circumstances, chlorine production will also be reduced and the catholyte will smell like bleach. Sight tubes 5 or 5' can also be used to drain the electrolytic chambers as necessary by pulling the sight tubes down and letting the solution flow out. In this particular embodiment, it is preferable to have the sight tubes composed of a flexible material. Sight tube 5 can further specifically be used to control conductivity in the cathode chamber by acting as an inlet for fresh water to lower the concentration of sodium hydroxide in the catholyte. Additionally, both sight tubes 5 and 5' may act as air or fluid inlets to the cathode and anode chambers, respectively, to promote turbulence within the fluids contained therein. Both sight tubes 5 and 5' may also act as "P-traps" for the cathode and anode chambers, respectively. More particularly, sight tubes 5 and 5' can prevent the gaseous contents of the electrode chambers from escaping the chambers when the distribution means, such as the venturi, is not operating. Moreover, sight tube 5' can act as an inlet for injection of air into the anode chamber to produce ozone and mixed oxidants to further disinfect the water treated. Sight tube 5' can also act as an inlet for other chemical solutions, such as chloride salt solutions.

In assembling the electrolytic cell, the portion of the electrolytic cell including the electrodes and flanges is preferably assembled first. A sealant as known in the art, preferably room temperature vulcanizing (RTV) silicone sealant, is advantageously disposed between electrolytic components that are in contact with each other. A thin layer of the sealant is also preferably placed along the perimeter of electrode-chamber-separating element 14 that faces the cathode 15 and along the perimeter of electrode-chamber-separating element 14 that faces the anode 16. When installing an electrode-chamber-separating element 14 comprising a membrane, it is important to install the membrane with the cathode side facing the cathode 15. Insular plastic spacers 9 are placed in bolt holes 27 and 27' of flange 7 and 7', respectively, prior to securing the flanges/electrode assembly together with bolts or threaded rods 1. Spacers 9 aid in assembly and prevent shorting of electrodes 15 and 16 to bolts 1 should the assembly become misaligned. Couplers 8 and 8' are typically attached to flanges 7 and 7', respectively, by cement or threaded connections. Elongated members 6 and 6' are then screwed into couplers 8 and 8', respectively. Once the electrolytic cell is assembled, it may be supported by a support structure 29, or suitable enclosure, as shown in FIG. 1. Support structure 29 may have incorporated a power source 32 therein. However, the electrolytic cell may be supported or enclosed by other structures or methods as known in the art.

Figure 7:
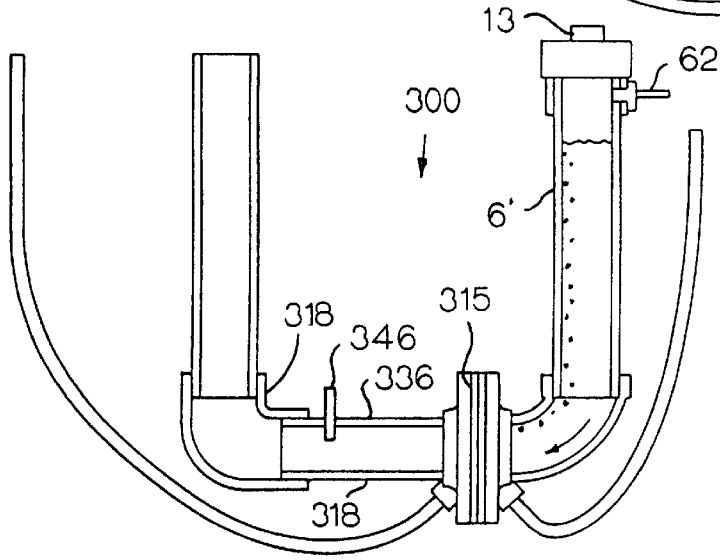
FIG. 7 is a view of the apparatus of FIG. 6 rotated about a horizontal axis so as to utilize a method of gaseous attenuation of the electrolytic generator.

FIG. 6 shows another embodiment of the present invention. In this embodiment, an elongated horizontal section 36 is included as part of the cathode chamber 18. This horizontal section 36 is included so as to allow a pocket of gas 40, such as hydrogen, formed at the cathode 15 during the electrolysis of a reactant, such as a chloride salt, to be trapped within the horizontal section 36 of the cathode chamber. FIG. 7 shows the apparatus of FIG. 6 rotated on a horizontal axis, with the cathode portion being rotated downward. This downward rotation causes the hydrogen gas 40 to back up within the horizontal section 36 and contact the cathode 15. The electrolytic reaction of the cell does not proceed at the surface of the cathode 15 that is contacted by the hydrogen gas 40. As a result, the current in the cell is reduced, which thereby reduces the output of anolytic product at the anode 16, in this case chlorine. In this manner, the production of chlorine, or another anolytic product, may be regulated. This method, with or without the aid of catholyte dilution control, allows for rapid ramping adjustment of the quantity of electrolytic products made.

Figure 6A:
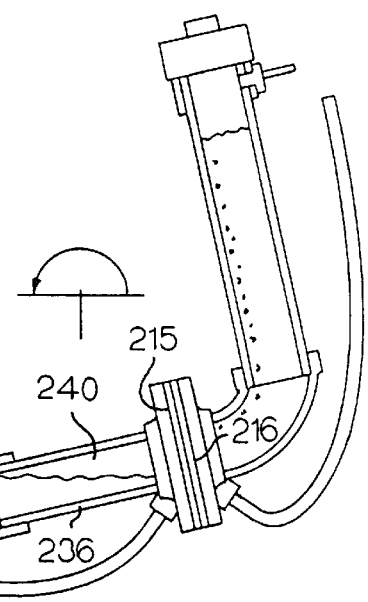

FIG. 6A shows another embodiment of the present invention in which gas may be trapped within the cathode. Wall or barrier 46 may be disposed within cathode chamber 18, so as to trap within the top portion of horizontal section 36 gas generated therein or in another portion of chamber 18 depending on where wall 46 is positioned. Wall 46 may be adjustable, so as to either increase or decrease the cross-sectional area of the cathode chamber 18 blocked. Gas produced at the cathode 15 can build up next to wall 46 and eventually contact cathode 15, thereby reducing the output of the device as discussed above. Wall 46 may be positioned anywhere within cathode chamber 18, so as to provide a means of trapping gas within the chamber.

Figure 10:
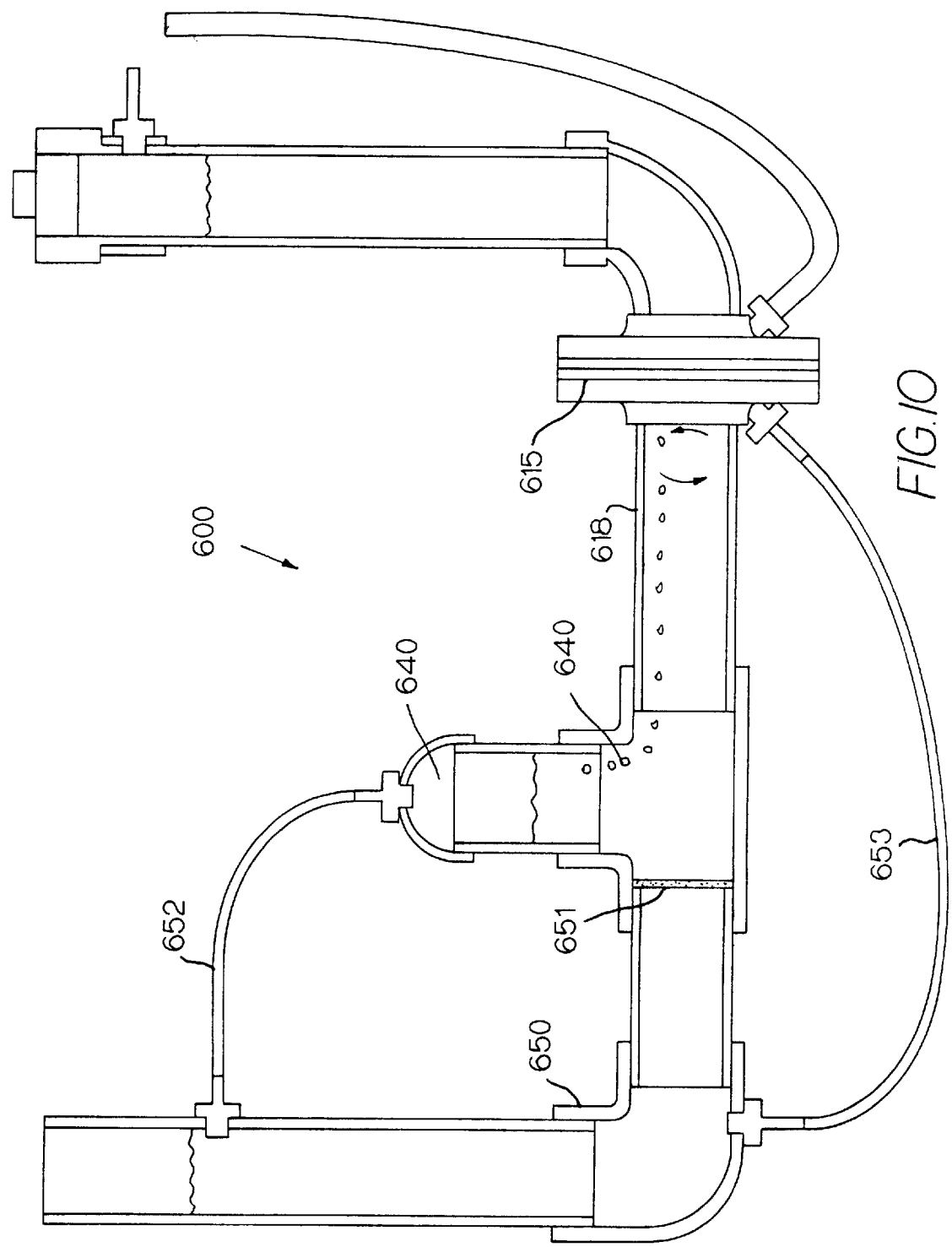
FIG. 10 is a view of another embodiment of the present invention.

FIG. 10 shows another embodiment of the present invention in which the gas produced within the cathode chamber is used to regulate the production of electrolytic products within the electrolytic cell. In this embodiment, a mechanical means for introducing fresh water into the cathode chamber is included. Reservoir 92 contains a solution 99, such as water, that has a concentration of catholyte, such as sodium hydroxide, which is lower than the concentration of the catholyte within cathode chamber 18. Reservoir 92 also contains a liquid pump 91 to which is attached a gas actuator 90. When gas, such as hydrogen gas, generated in cathode chamber 18 leaves the chamber through gas exit 89 it contacts actuator 90. The actuator is thereby rotatably moved by the gas, thereby in turn operating the liquid pump 91. The solution 99 in the reservoir 92 flows or is drawn into liquid pump 91 through pump inlet 93 and travels out of pump 91 through liquid outlet 94. Sight tube 5, partially shown without branch, is in fluid communication with cathode chamber 18 and liquid outlet 94. The solution 99 is metered by liquid pump 91 through sight tube 5 into chamber 18, where it lowers the concentration of catholyte. The displaced catholyte exits through overflow 97. The catholyte concentration can thereby be maintained within chamber 18. The concentration of catholyte affects the current density of the cathode 15, and thereby affects the generation of electrolytic products at both cathode 15 and anode 16.

Figure 8:
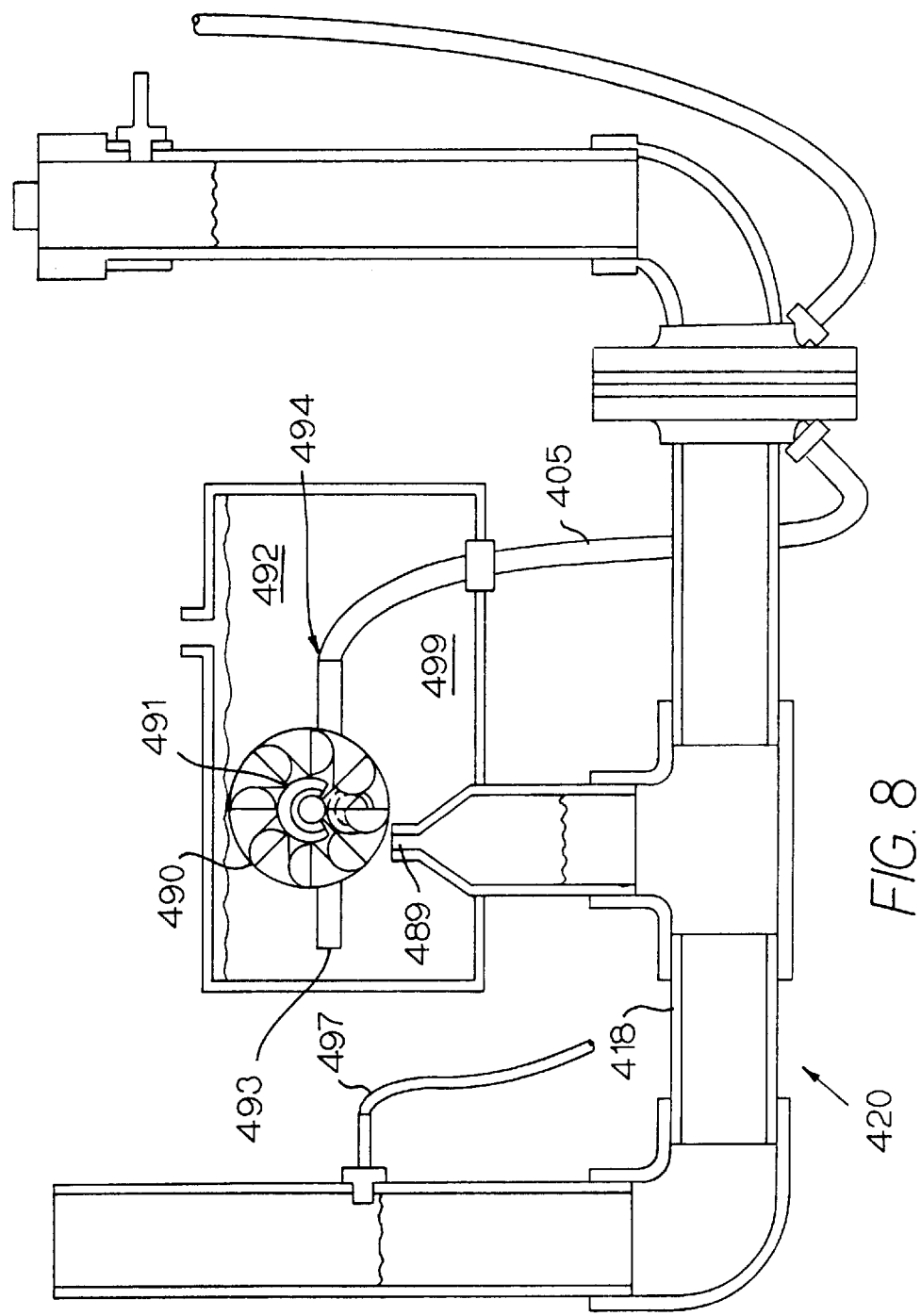
FIG. 8 is a view of another embodiment of the apparatus of the present invention.

FIG. 8 shows another embodiment of the present invention. In FIG. 8, a second chamber 50 has been added to the cathode portion of the electrolytic cell. The second chamber 50 is intended to hold a liquid, such as water, that contains little or no catholytic product, such as sodium hydroxide. The second chamber 50 may be separated from the cathode chamber 18 by a barrier 51 that allows some diffusion therethrough between the cathode chamber 18 and the second chamber 50. The second chamber 50 also includes an upper portion that may be generally vertical. This upper portion of the second chamber is in fluid communication with the upper portion of the cathode chamber via a tube 52 or similar means. The communicating tube or channel 52 is positioned within the upper portion of the second chamber 50 at a point that is below the liquid level within the chamber. When the electrolytic cell is operated within this embodiment, a convective current arises by the action of the hydrogen gas, generated at the cathode 15, flowing from the cathode chamber 18 through the communication tube 52 to the upper portion of the second chamber 50. Catholytic product, such as sodium hydroxide, diffuses from the cathode chamber 18, where its concentration is higher, through the diffusion barrier 51 to the second chamber 50, where its concentration is lower. In this manner, the catholytic reaction, which is dependent on the concentration of products at the cathode 15, proceeds more efficiently with the constant removal of catholytic products from the area adjacent to the cathode 15.

Figure 9:
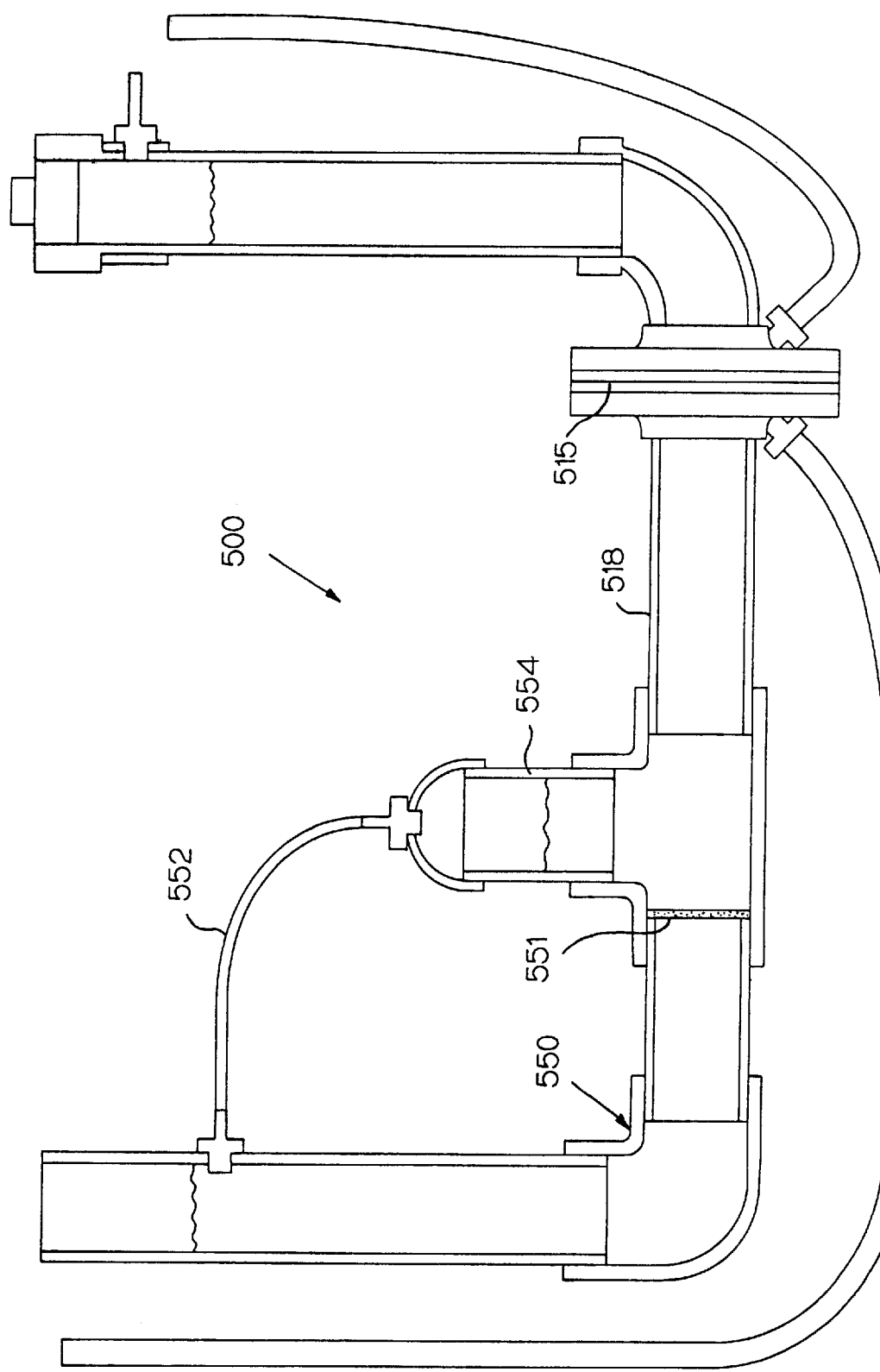
FIG. 9 is a view of even another embodiment of the present invention.

In FIG. 9, the embodiment of FIG. 8, is shown with the addition of a tube 53 in fluid communication between the lower portion of the second chamber 50 and a point adjacent to the cathode 15 within the cathode chamber 18. In this embodiment, the diffusion barrier 51 may be constructed so as to prevent completely diffusion therethrough, or it may allow some diffusion to occur. During the operation of the electrolytic cell, a convection current is generated by the removal of hydrogen gas 40 from the cathode chamber 18 through the communication tube 52 to the upper portion of the second chamber 50. The removal of this gas tends to draw dilute liquid from the lower portion of the second chamber 50 through the communication tube 53 to the outlet located within the cathode chamber 18 adjacent to the cathode 15. In this manner, the electrolytic reaction may proceed more efficiently due to the minimization of the concentration of catholytic products in the space within the cathode chamber 18 contacting and adjacent to the cathode 15.

A method of generating chlorine and ozone is also provided. In this method, electrolytic chambers 18 and 19 are each filled through elongated members 6 and 6', respectively, with about 1 liter of water, depending on the size of the unit. A salt of chloride is then added to anode chamber 19. Although any salt of chloride may be used, an alkali metal salt is the preferred salt, including sodium chloride and potassium chloride. However, sodium chloride is preferred. In general, about 0.25 pounds to about 11 pounds of the salt, depending on the size of the unit, is placed in anode chamber 19, but preferably about 0.25 pounds of the salt is added to a typical run in a 2-inch diameter flange unit. Threaded cap 13 is placed on top end 31 of elongated cylinder 6' and the cap is attached to the chlorine gas delivery means mentioned above, such as a venturi tube, thereby forming the anode vent. Top end 30 of elongated member 6 is preferably left open to the atmosphere in one embodiment, but can be closed in another preferred embodiment in which the venturi's makeup air is supplied by suction through sight tube 5'. Air or oxygen is preferably fed into the anode chamber through sight tube 5'. A power supply is then connected to the electrodes. The positive cable of the power supply is connected to second surface 25 of anode 16 and the negative cable is connected to second surface 22 of cathode 15. For example, the flow of water through the venturi is started and continues until adequate flow produces suction on the anode chamber of the apparatus. In the embodiment including translucent or transparent elongated pipe 6, this suction created in the anode chamber may be used as a means for determining the performance of the venturi. Power is then applied to the power supply. The unit should be run for several minutes and the water coming out of the venturi should be tested by methods known in the art for the presence of chlorine or ozone, such as ORP. During electrolysis, chlorine gas, ozone and other mixed oxidants are liberated at anode 16, bubble to the surface of the anolyte in anode chamber 19, and are injected into the water to be treated through the anolytic product delivery means. Sodium hydroxide forms in cathode chamber 18, but generally it should not be allowed to accumulate at a concentration greater than about 15 to 30 weight percent, depending upon the desired operation, and the limitations of the particular electrode-chamber-separating element 14. For operator safety, one may sacrifice some current efficiency by maintaining the sodium hydroxide concentration at less than 5 to 10 weight percent by frequent changing or displacing of the water in cathode chamber 18. Moreover, when replacing water in cathode chamber 18, it is preferred to leave a sodium hydroxide electrolyte residue, in order to better conduct electricity and to have the output characteristics of the unit more closely match previous demand. Upon subsequent activity, hydrogen gas is produced in cathode chamber 18 and escapes to the atmosphere through top end 30 of elongated member 6. Salt must be added periodically as needed based upon the test results of the purified water residual free chlorine level. Water in the anode chamber is periodically emptied and used as normal bleach. Sodium hydroxide produced in the cathode chamber can be used for purposes known in the art.

The amounts of chlorine and ozone generated per minute are dependent on the spacing between the electrodes, the size of the unit, the concentration of the electrolytes in the cathode and anode chambers and the power supplied. For example, when the spacing between the electrodes is 0.5 inches in a nominal 2 inch diameter unit, about 50 gallons of water per minute can be treated to 2 parts per million of chlorine in a cell configured to pull 20 amps of 12 volts DC current. The apparatus may be operated so that either chlorine or ozone is generated individually, as well as in combination.

The apparatus can be powered with any power supply as known in the art, including a DC power supply, solar panels, battery or battery charger. While, electrolytic cell 20 is preferably powered by about 6 to about 12 volts DC, there is no upper limit on applied voltages other than the physical limitations of the properties of construction. Furthermore, 3 volts DC can also adequately power the cell, but at a reduced rate, assuming the minimal threshold current density is exceeded. Electrolytic cell 20 may furthermore be powered with full wave and half wave pulsed DC. However, if half wave pulsed DC is used to power the cell, the chlorine gas output will be reduced by about half.

In yet another aspect of the invention, a method of treating water is described. The method includes providing the electrolytic cell described above, electrolyzing a salt of chloride to produce chlorine gas and oxygen to produce ozone, then contacting the water with the chlorine and ozone gases. It is preferred that the water is first processed so that suspended solids, including organic matter, are removed by methods including filtration or settling, or any other methods known in the art, prior to being treated. The water pretreatment step will allow less chlorine and ozone to be used for the treatment and will improve the taste and quality of the water.

The above describes preferred embodiments of the invention. It is to be noted that many of the component parts may be replaced with other, similar parts that are encompassed within the present invention. For example, the flange may have a polyhedral shape, such as a square, or may be replaced with a union, or be an injection molded, cast, or vacuum formed custom part by these and other means known in the art such that the basic functionality is substantially the same.

What is claimed is:

1. An apparatus for generating at least one chemical by electrolysis comprising:
   an anode plate;
   a cathode plate opposing said anode plate;
   at least one sealing gasket interposed between said cathode plate so as to form a reaction chamber between said anode plate and said cathode plate;
   an anolyte reaction chamber attached to said anode plate essentially directly opposite said sealing gasket, said anolyte reaction chamber being in fluid communication with said anode plate;
   a catholyte reaction chamber attached to said cathode plate essentially directly opposite said sealing gasket, said catholyte reaction chamber being in fluid communication with said cathode plate;
   at least one tubular member in fluid communication with said anolyte reaction chamber, wherein said tubular member is composed of a transparent material and is attached to said anolyte reaction chamber such that the volume of a first liquid present in said anolyte reaction chamber can be determined by the volume of the first liquid present in said anolyte reaction chamber tubular member; and
   at least one tubular member in fluid communication with said catholyte reaction chamber, wherein said tabular member is composed of a transparent material and is attached to said catholyte reaction chamber such that the volume of a second liquid present in said catholyte reaction chamber can be determined by the volume of the second liquid present in said catholyte reaction chamber tubular member.

2. The apparatus of claim 1 wherein said anode plate is composed of carbon, graphite, titanium, expanded titanium, zirconium, expanded zirconium, hafnium, expanded hafnium, niobium, expanded niobium, nickel, expanded nickel, chromium, expanded chromium, a transition metal, a metal alloy, or a combination thereof.

3. The apparatus of claim 2 wherein said anode plate is composed of expanded titanium.

4. The apparatus of claim 2 wherein said anode plate includes a catalytic cracking coating.

5. The apparatus of claim 4 wherein said coating includes zirconium, niobium, silver, hafnium, platinum, tantalum, rhodium, iridium, ruthenium, gold, tin, titanium oxide, ruthenium oxide, iridium oxide, tantalum oxide or a combination thereof.

6. The apparatus of claim 1 wherein said anode plate has a first reactive section which is sized to be not greater than one-half of said anode plate, and which has a second reactive section which is sized to be not greater than one-half of said anode plate and which does not include any portion of said first reactive section.

7. The apparatus of claim 6 wherein said anode plate can be repositioned to place said second reactive section between said anode sealing gasket and said anolyte sealing gasket.

8. The apparatus of claim 1 wherein said cathode plate is composed of stainless steel, titanium, expanded titanium, zirconium, expanded zirconium, hafnium, expanded hafnium, niobium, expanded niobium, nickel, expanded nickel, chromium, expanded chromium, a transition metal, a metal alloy, or a combination thereof.

9. The apparatus of claim 8 wherein said cathode plate is composed of expanded titanium.

10. The apparatus of claim 1 wherein said a cathode plate has a first reactive section which is sized to be not greater than one-half of said cathode plate, and which has a second reactive section which is sized to be not greater than one-half of said cathode plate and which does not include any portion of said first reactive section.

11. The apparatus of claim 10 wherein said cathode plate can be repositioned to place said second reactive section between said cathode sealing gasket and said catholyte sealing gasket.

12. The apparatus of claim 1 further including an electrode-chamber-separating element interposed between said anode plate and said cathode plate.

13. The apparatus of claim 12 wherein said electrode-chamber-separating element is a diaphragm, a membrane, a permeable membrane, an ion-exchange membrane, a perfluorinated membrane, a ceramic plate, or a combination thereof.

14. The apparatus of claim 1 wherein said anolyte reaction chamber has a free end, and the free end includes a cap.

15. The apparatus of claim 1 wherein said anolyte reaction chamber tubular member is composed of polyvinyl chloride.

16. The apparatus of claim 1 wherein said anolyte reaction chamber tubular member is composed of polyethylene.

17. The apparatus of claim 1 wherein said catholyte reaction chamber tubular member is composed of polyvinyl chloride.

18. The apparatus of claim 1 wherein said catholyte reaction chamber tubular member is composed of polyethylene.

19. The apparatus of claim 1 further including a means for introducing fresh water into the catholyte reaction chamber.

20. An apparatus for generating at least one chemical by electrolysis comprising:

an anode plate, having a first reactive section which is sized to be not greater than one-half of said anode plate, and having a second reactive section which is sized to be not greater than one-half of said anode plate and which does not include any portion of said first reactive section;

a cathode plate opposing said anode plate, said cathode plate having a first reactive section which is sized to be not greater than one-half of said cathode plate and having a second reactive section which is sized to be not greater than one-half of said cathode plate and which does not include any portion of said first reactive section;

at least one sealing gasket interposed between said first reactive section of said anode plate and said first reactive section of said cathode plate so as to form a reaction chamber between said anode plate and said cathode plate;

an anolyte reaction chamber attached to said anode plate essentially directly opposite said sealing gasket, said anolyte reaction chamber being in fluid communication with said anode plate;

a catholyte reaction chamber attached to said cathode plate essentially directly opposite said sealing gasket, said catholyte reaction chamber being in fluid communication with said cathode plate;

at least one tubular member in fluid communication with said anolyte reaction chamber, wherein said tubular member is composed of a transparent material and is attached to said anolyte reaction chamber such that the volume of a first liquid present in said anolyte reaction chamber can be determined by the volume of the first liquid present in said anolyte reaction chamber tubular member; and at least one tabular member in fluid communication with said catholyte reaction chamber, wherein said tubular member is composed of a transparent material and is attached to said catholyte reaction chamber such that the volume of a second liquid present in said catholyte reaction chamber can be determined by the volume of the second liquid present in said catholyte reaction chamber tubular member.

21. The apparatus of claim 20 wherein said anode plate is composed of carbon, graphite, titanium, expanded titanium, zirconium, expanded zirconium, hafnium, expanded hafnium, niobium, expanded niobium, nickel, expanded nickel, chromium, expanded chromium, a transition metal, a metal alloy, or a combination thereof.

22. The apparatus of claim 21 wherein said anode plate includes a catalytic cracking coating composed of zirconium, niobium, silver, hafnium, platinum, tantalum, rhodium iridium, ruthenium, gold, tin, titanium oxide, ruthenium oxide, iridium oxide, tantalum oxide or a combination thereof.

23. The apparatus of claim 20 wherein said cathode plate is composed of stainless steel, titanium, expanded titanium, zirconium, expanded zirconium, hafnium, expanded hafnium, niobium, expanded niobium, nickel, expanded nickel, chromium, expanded chromium, a transition metal, a metal alloy, or a combination thereof.

24. The apparatus of claim 20 wherein said anode plate can be repositioned to place said second reactive section between said anode sealing gasket and said anolyte sealing gasket.

25. The apparatus of claim 20 wherein said cathode plate can be repositioned to place said second reactive section between said cathode sealing gasket and said catholyte sealing gasket.

26. An apparatus for generating at least one chemical by electrolysis comprising:

an anode plate, having a first reactive section which is sized to be not greater than one-half of said anode plate, and having a second reactive section which is sized to be not greater than one-half of said anode plate and which does not include any portion of said first reactive section;

a cathode plate opposing said anode plate, said cathode plate having a first reactive section which is sized to be not greater than one-half of said cathode plate and having a second reactive section which is sized to be not greater than one-half of said cathode plate and which does not include any portion of said first reactive section;

an electrode-chamber-separating element interposed between said anode plate and said cathode plate;

an anolyte reaction chamber in fluid communication with said anode plate;

a catholyte reaction chamber in fluid communication with said cathode plate;

at least one anode sealing gasket interposed between said anode plate and said separating element, said anode gasket abutting said first reactive section of said anode plate so as to form a first transfer chamber between said first reactive anode section and said separating element, said transfer chamber accommodating a predetermined volume of anolyte;

at least one anolyte reaction chamber sealing gasket interposed between said anode plate and said anolyte reaction chamber, said anolyte gasket abutting said first reactive section of said anode plate essentially directly opposite said anode gasket;

at least one cathode sealing gasket interposed between said cathode plate and said separating element, and abutting said first reactive section of said cathode plate so as to form a second transfer chamber between said first reactive cathode section and said separating element, said transfer chamber accommodating a predetermined volume of catholyte;

at least one catholyte reaction chamber sealing gasket interposed between said cathode plate and said catholyte reaction chamber, said catholyte gasket abutting said first reactive section of said cathode plate essentially directly opposite said cathode gasket;

at least one tubular member in fluid communication with said anolyte reaction chamber, wherein said tubular member is composed of a transparent material and is attached to said anolyte reaction chamber such that the volume of a first liquid present in said anolyte reaction chamber can be determined by the volume of the first liquid present in said anolyte reaction chamber tubular member, and at least one tubular member in fluid communication with said catholyte reaction chamber, wherein said tubular member is composed of a transparent material and is attached to said catholyte reaction chamber such that the volume of a second liquid present in said catholyte reaction chamber can be determined by the volume of the second liquid present in said catholyte reaction chamber tubular member.

27. The apparatus of claim 26 wherein said anode plate is composed of carbon, graphite, titanium, expanded titanium, zirconium, expanded zirconium, hafnium, expanded hafnium, niobium, expanded niobium, nickel, expanded nickel, chromium, expanded chromium, a transition metal, a metal alloy, or a combination thereof.

28. The apparatus of claim 27 wherein said anode plate includes a catalytic cracking coating composed of zirconium, niobium, silver, hafnium, platinum, tantalum, rhodium, iridium, ruthenium, gold, tin, titanium oxide, ruthenium oxide, iridium oxide, tantalum oxide or a combination thereof.

29. The apparatus of claim 26 wherein said cathode plate is composed of stainless steel, titanium, expanded titanium, zirconium, expanded zirconium, hafnium, expanded hafnium, niobium, expanded niobium, nickel, expanded nickel, chromium, expanded chromium, a transition metal, a metal alloy, or a combination thereof.

30. The apparatus of claim 26 wherein said electrode-chamber-separating element is a diaphragm, a membrane, a permeable membrane, an ion-exchange membrane, a perfluorinated membrane, a ceramic plate; or a combination thereof.

31. The apparatus of claim 26 wherein said anode, plate can be repositioned to place said second reactive section between said anode sealing gasket and said anolyte sealing gasket.

32. The apparatus of claim 26 wherein said cathode plate can be repositioned to place said second reactive section between said cathode sealing gasket and said catholyte sealing gasket.

* * * * *